United States Patent [19]

Hildin

[11] Patent Number: 5,844,599
[45] Date of Patent: Dec. 1, 1998

[54] VOICE-FOLLOWING VIDEO SYSTEM

[75] Inventor: John J. Hildin, Lincroft County, N.J.

[73] Assignee: Lucent Technologies Inc., Murray Hill, N.J.

[21] Appl. No.: 906,822

[22] Filed: Aug. 6, 1997

Related U.S. Application Data

[63] Continuation of Ser. No. 262,729, Jun. 20, 1994, abandoned.

[51] Int. Cl.[6] .................................................. H04M 11/00
[52] U.S. Cl. .............................................. 348/15; 348/169
[58] Field of Search ................................. 348/15, 14, 16, 348/17, 18, 19, 20, 169, 214, 162, 164; 379/202, 204, 205, 203, 93.17, 93.21

[56] References Cited

U.S. PATENT DOCUMENTS

| | | |
|---|---|---|
| 4,529,840 | 7/1985 | Colton et al. . |
| 4,531,024 | 7/1985 | Colton et al. . |
| 4,581,758 | 4/1986 | Coker et al. . |
| 4,596,041 | 6/1986 | Mack ........................................ 455/53 |
| 4,847,829 | 7/1989 | Tompkins et al. . |
| 4,924,387 | 5/1990 | Jeppesen . |
| 4,995,071 | 2/1991 | Weber et al. . |
| 5,099,510 | 3/1992 | Blinken, Jr. et al. . |
| 5,206,721 | 4/1993 | Ashida et al. ............................. 348/15 |
| 5,438,357 | 8/1995 | McNelley .................................. 348/14 |

FOREIGN PATENT DOCUMENTS

| | | | |
|---|---|---|---|
| 404122184 | 4/1992 | Japan ............................... H04N 7/15 |
| 40615306 | 4/1994 | Japan ............................... H04N 7/15 |

OTHER PUBLICATIONS

"CameraMan XL, Stand–Alone System Data"; ParkerVision, Literature Part No. LCMPD01, Mar. 2, 1993–Revision 1, 2 pages.

"CameraMan XL, Integrated System Data"; ParkerVision, Literature Part No. LCMPD02, Mar. 2, 1993–Revision 1, 2 pages.

"CameraMan XL, Product data"; ParkerVision, Literature Part Nos. LCMPD03–LCMPD12, Feb. 16, 1993 Revision 1, 10 pages; Product Data; Literature Part No. LCMPD13, Mar. 22, 1993–Revision 0, 1 page; and Product data; Literature Part No. LCMPD22, May 4, 1993–Revision 0, 1 page.

Parkervision, Literature Part No. LCMSM01, date unknown, 1 page.

"CameraMan ParkerVision", Literature Part No. LCMCS01, 12 pages.

ParkerVision Product Literature, "CameraMan," date unknown, 1 page.

*Primary Examiner*—Stella Woo

[57] ABSTRACT

A voice-following video system for dynamically capturing the view of an active speaker includes a video camera, a position control system for the video camera, and one or more voice-activated emitters. A voice-activated emitter is associated with each potential speaker. As a person talks, the associated voice-activated emitter transmits a position signal. The position control system uses the position signal as a beacon to determine the location of the active speaker. The position control system then adjusts the pan and/or tilt of the video camera to bring the active speaker into the field of view and tracks that person's movements. In this manner, as one person stops speaking and another starts, the video camera is automatically repositioned, capturing the view of the active speaker.

42 Claims, 7 Drawing Sheets

FIG. 1

EMITTER BADGE (Front View)

FIG. 2A

EMITTER BADGE (Rear View)

VOICE-FOLLOWING VIDEO SYSTEM

This is a continuation of application Ser. No. 08/262,729 filed Jun. 20, 1994, now abandoned.

BACKGROUND OF THE INVENTION

1. Field of the Invention

The present invention relates to video systems. More particularly, the present invention relates to voice-following video systems which dynamically follow the active speaker among a group of individuals.

2. Related Art

Video systems are typically employed in a multitude of situations. Common applications include the recording or broadcast of business presentations, lectures, seminars, and the recording of social events. Additionally, video conferencing between remote locations has become an increasingly popular alternative to having off-site meetings.

One historic problem associated with video systems has been providing low cost, automated means to dynamically and gracefully switch the video camera's field of view. In a limited number of applications, such as the recording of a lecturer in a classroom, a static field of view is adequate. Most applications, however, require the ability to change the camera's field of view between individuals, charts, or visual aids. Group video conferencing, which requires the simulation of face-to-face communications with the local and remote participants is an illustrative example of an environment where versatile camera positioning is imperative.

Generally, both manual and automated techniques have been utilized to address this problem. Manual switching between fields of view has proven to be neither pragmatic nor satisfactory. In some applications, a technician has been employed to control the pan, tilt, and zoom of a single video camera. In other cases, several fixed cameras are used and a technician manually switches control between the different cameras. The use of technicians is cost prohibitive (technicians are expensive) and does not allow for spontaneous conferencing, since the technician time in most cases must be scheduled in advance. Moreover, it is often disturbing to the participants to have a technician roam about the meeting with a video camera.

Accordingly, conventional video systems typically go to great lengths to circumvent the uses of technicians by allowing users to manually control the position of the camera with hand-held controllers for the pan, tilt, and zoom functions. Additionally, some systems provide a number of location presets. The user first programs the presets and then, with a one-button control, positions the camera between these predefined locations. This feature has a number of drawbacks. Prominent among them is that the users are burdened with the distractive task of choreographing the event or meeting. In addition, the users cannot be permitted to move outside these preset locations, that is, free movement is significantly restricted.

Automated solutions also have notable limitations. One such solution involves acoustic detection of voice energy with camera positioning. For example, U.S. Pat. No. 4,581, 758 to Coker discloses the use of spatially separated microphones for obtaining the location of a sound source which can be used for camera pointing. One of the problems common to acoustic detection include distinguishing between sounds originating in the room and those being produced from the far end. Such a system may tend to point to the conferencing audio speakers when a distant participant is speaking. Accordingly, systems which focus exclusively on voice energy detection have been only marginally successful.

ParkerVision, Inc., 8493 Baymeadows Way, Jacksonville, Fla. 32258 has marketed several camera positioning products. Their CameraMan® products allow a video camera to automatically track the movements of a person. The CameraMan® is a swivel base upon which a video camera is placed. This base is programmed to track the movement of a person with a hand-held or wearable wand. The wand acts as an infrared electronic beacon for the base to follow by panning the camera. In lieu of following the wand, the CameraMan® also provides position presets. The field of view of the camera may be manually (by remote control) or automatically cycled between these preset locations.

The wand also incorporates a wireless microphone so that the voice of a person holding the wand will be picked up and transmitted, by VHF-TV frequencies, to the video camera.

The CameraMan® products and systems that employ similar infrared tracking have fundamental limitations. Namely, these systems do not provide the ability of capturing a conversation as it dynamically evolves. In multiple-user applications the wand must actually be passed from hand to hand as different people speak. This is awkward and does not lend itself to natural flowing conversations.

SUMMARY OF THE INVENTION

The invention is a voice-following video system for dynamically tracking an active speaker. This system includes a video camera, a position control system for the video camera, and one or more voice-activated emitters. The video camera is mechanically and electrically coupled to the position control system. Through the mechanical coupling, the position control system can pan and tilt the video camera. Through the electrical coupling, the position control system can command the video camera to zoom-in or zoom-out.

Each voice-activated emitter is to be associated with a person who is a potential speaker to be tracked by the video camera. For example, each emitter may be associated with a participant of a video conference. In the preferred embodiment, the emitters are configured as badges which are worn on a conference participant's clothing. When a participant is speaking, the emitter will detect the sound or voice energy and will produce an infrared position signal. The infrared position signal is received by the position control system. The position control system determines the position of the active emitter (using, for example, the geometric principles of triangulation) and adjusts the pan and tilt of the video camera to bring the speaking participant (i.e., the active speaker) into the field of view of the video camera.

The position control system includes a general purpose computer, an infrared receiving system, and a servo-controller. The voice-activated emitter includes an audio detector circuit and a transmitter circuit. The audio detector circuit includes thresholding and tuning, which facilitate the rejection of extraneous noises to make the emitter responsive only to the voice energy of the person wearing the emitter.

In an alternate embodiment, the emitter may also encode the voice energy of the speaker into the infrared position signal for transmission to the position control system. To facilitate this, the voice-activated emitter of this alternate preferred embodiment further includes a carrier oscillator and a modulator circuit. The carrier oscillator and the modulator circuit modulate the voice energy of the speaker and provide a modulated voice signal to the transmitter. The modulated voice signal is then used to produce an infrared modulated position signal. In this alternate preferred embodiment, the position control system will decode the infrared position signal to reveal the encoded voice energy. This eliminates the need for centrally located microphones to pick up the voice energy of the conference participants.

The voice-following video system of the invention may be operated in one of two different modes. In an automatic mode, the voice-following features of the invention maintain the camera field of view on the active speaker. In a manual mode, a remote control key pad allows manual positioning of the video camera.

The foregoing, and other features and advantages of the invention will be apparent from the following, more particular description of a preferred embodiment of the invention, as illustrated in the accompanying drawings.

DETAILED DESCRIPTION OF THE PREFERRED EMBODIMENTS

The preferred embodiments of the invention are discussed in detail below. While specific part numbers and/or configurations are discussed, it should be understood that this is done for illustration purposes only. A person skilled in the relevant art will recognize that other components and configurations may be used without parting from the spirit and scope of the invention.

The preferred embodiments of the invention are now described with reference to the figures where like reference numbers indicate like elements. Also in the figures, the left most digit of each reference number corresponds to the figure in which the reference number is first used.

Figure 1:
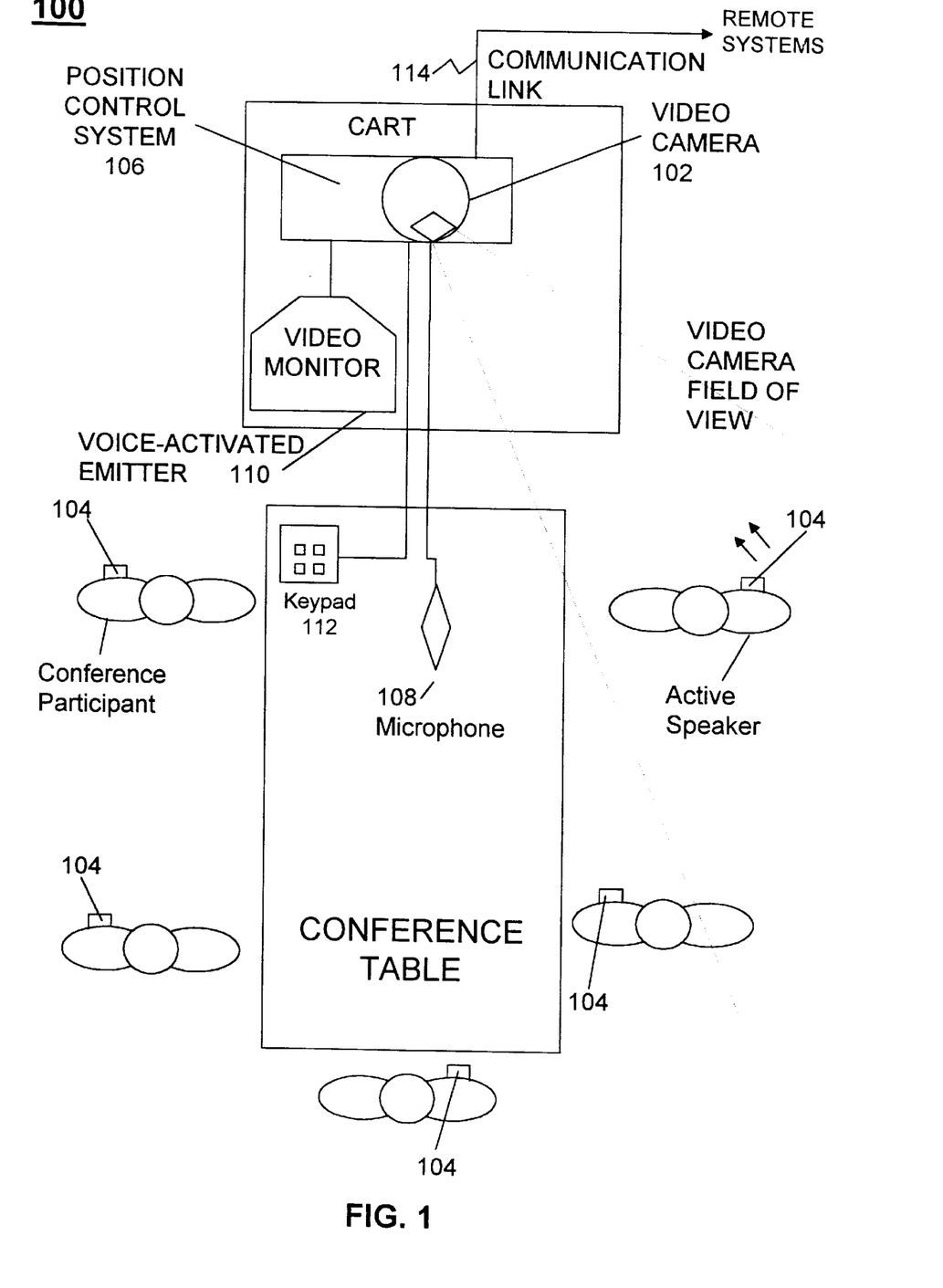
FIG. 1 is a high level block diagram of a voice-following video conferencing system 100.

FIG. 1 is a high level block diagram of a voice-following video conferencing system 100 (hereinafter, "video system 100"), according to the present invention. Video system 100 includes a digital video camera 102, a plurality of voice-activated emitters 104, a position control system 106, a microphone 108, a video monitor 110, and a keypad 112. Also shown in FIG. 1 is communication link 114, which connects video system 100 with similar remote systems for the transmission of audio, data, and video information. Communication link 114 may be, for example, a local area network, coaxial cable, a telephone transmission line, or a fiber optic cable.

A video conferencing application with multiple participants is illustrated to provide an understanding of the various features and aspects of the invention. Other applications for the invention include, for example, classroom, lecture hall, and social functions.

Figure 2A:
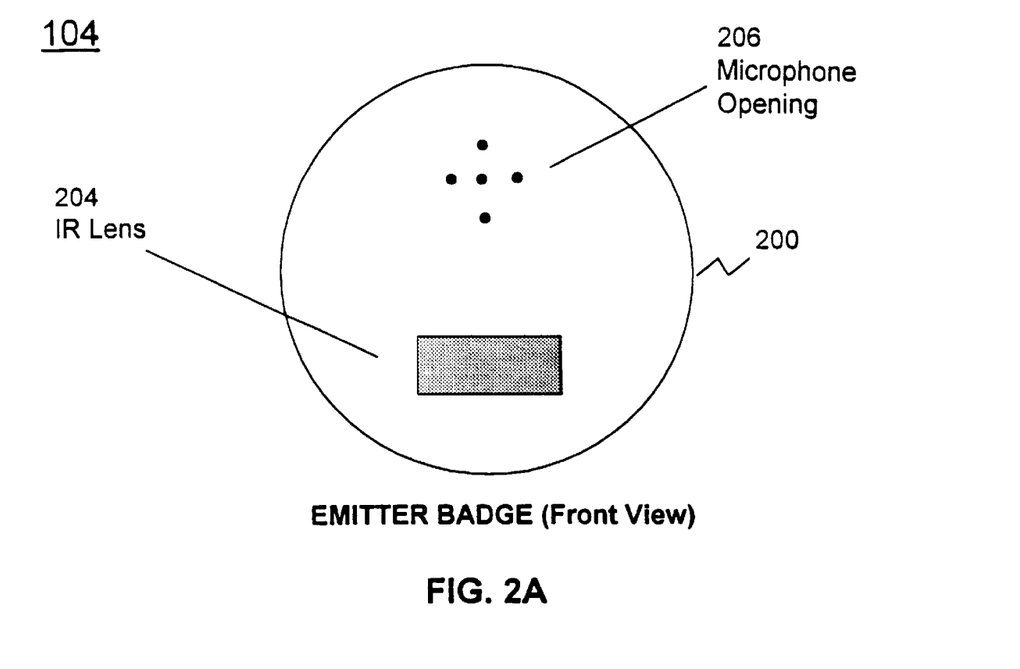
FIG. 2A illustrates an infrared voice-activated emitter badge 200 (front view)
Figure 2B:
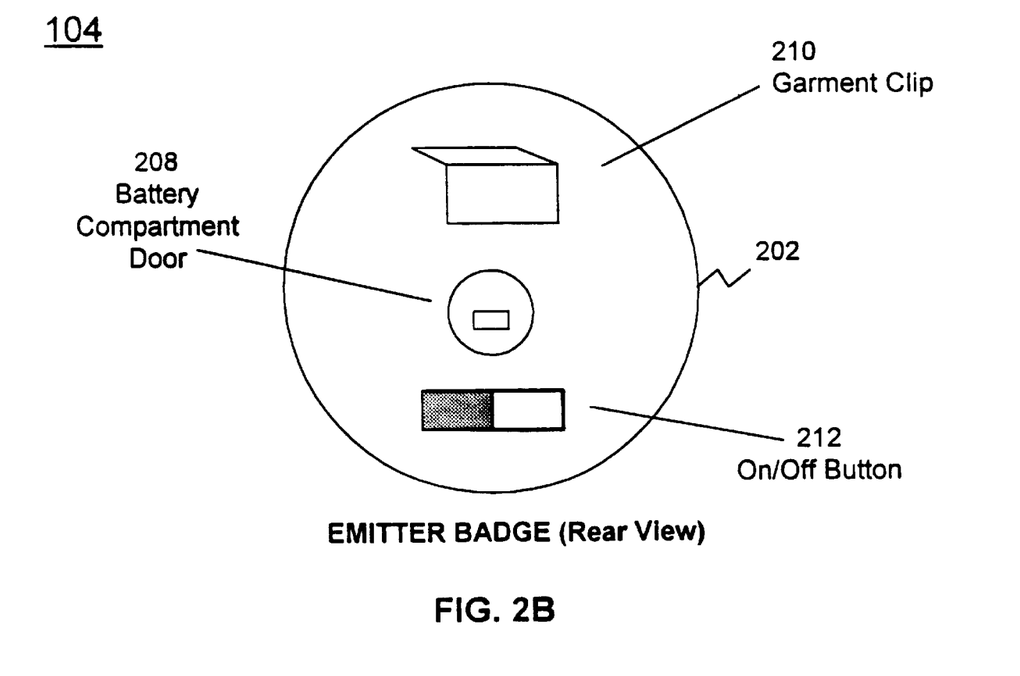
FIG. 2B illustrates an infrared voice-activated emitter badge 202 (rear view)

In this preferred embodiment, as a participant talks, the associated emitter 104 transmits and position control system 106 receives infrared (IR) signals. Each emitter 104 is in the form of a badge, which may be attached to the clothing of a participant. FIGS. 2A and 2B show the front view 200 and rear view 202, respectively, of emitter 104. On the front side, a microphone opening 206 and an IR lens 204 provide for the passage of the voice energy and the IR signals, respectively. On the rear side, emitter 104 has a garment clip 210, a battery compartment door 208, and an on/off button 212. Each emitter 104 is a self powered unit worn by a participant. Emitter 104 may also be produced in a form that is not worn, such as a table-top model, which is placed in close proximity to each participant.

Video camera 102 has conventional camera features and an RS-232 serial port for control. In addition, an appropriate lens filter is attached to reduce the amount of IR energy detected by the charged coupled device (CCD) array. This is desirable because a CCD can often resolve the normally invisible light, which may cause a flash on the video monitor 110 when emitter 104 is activated. This phenomena could be distracting to users of the conferencing system.

This preferred embodiment of the invention generally has two modes of operation. In a manual mode, the field of view of video camera 102 can be set to one or several participants, or on visual displays, such as a blackboard. Changes to the field of view, such as panning, tilting, and zooming are done manually through keypad 112. Keypad 112 is hardwired to position control system 106. However, a conventional wireless remote control system may also be used. Also, position control system 106 can be programmed for a number of preset locations. Thus, video camera 102 can be positioned between these preset locations by pressing an associated button on keypad 112. This manual mode may be used in applications that do not require spontaneous and frequent movements of video camera 102. A business presentation with a small number of participants and a structured agenda is an example.

For capturing conversations with free flowing interaction for true face-to-face video conferencing, the voice-following mode is used. In this mode, video system 100 will dynamically detect and gracefully change the field of view of camera 102 toward the active speaker among the participants. Each time a participant starts speaking, their associated emitter 104 is activated to transmit a signal (e.g., an IR signal) for the duration of time that the participant is talking.

Correspondingly, position control system 106 is equipped with IR sensors to detect the IR signal emitted by an emitter 104, and to determine the location of the active speaker based on the IR signal. Position control system 106 then pans and/or tilts video camera 102 toward the active speaker, if the person is not already in the field of view, and gracefully tracks the movement of that person. Position control system 106 can also send commands directly to video camera 102 for lens alignment. For example, position control system 106 can send zoom and focus commands to better view an active speaker. Heuristics and other conventional programming techniques are employed by position control system 106 to precisely determine the panning and tilting movements to achieve graceful positioning.

Figure 3:
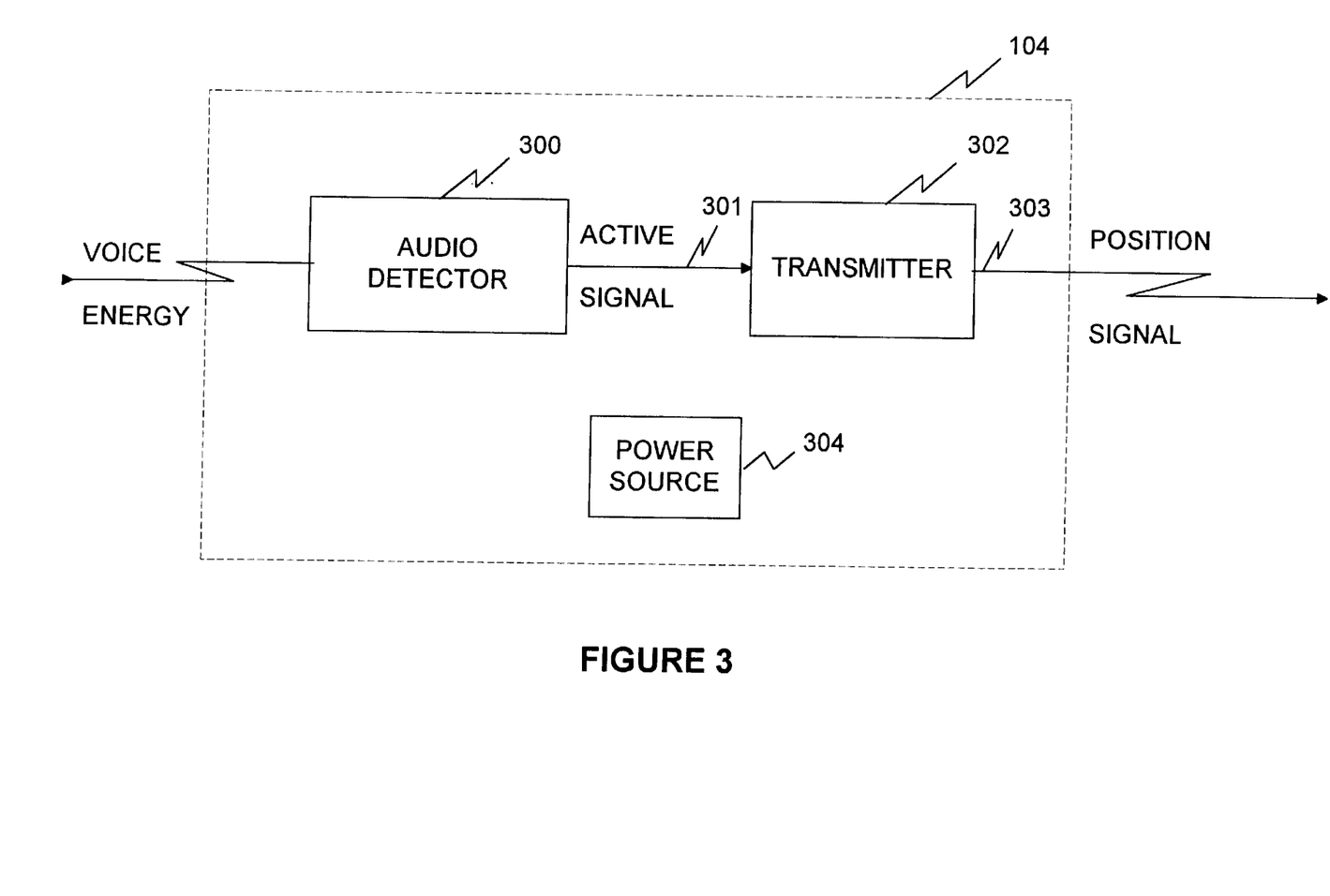
FIG. 3 is a high level block diagram of a voice-activated emitter 104.

FIG. 3 is a high level block diagram of emitter 104. Emitter 104 includes an audio detector 300, a transmitter 302, and a power source 304. Audio detector 300 is designed to detect voice energy in a predetermined zone, such that it will be activated only by the voice energy of the nearest participant (i.e., presumably, the person actually wearing the associated emitter 104). When audio detector 300 receives voice energy that exceeds a predetermined threshold, audio detector 300 produces an ACTIVE signal 301. For the duration of time that the participant talks above the threshold, ACTIVE signal 301 is maintained.

In response to ACTIVE signal 301, transmitter 302 emits a POSITION signal 303. In this preferred embodiment, POSITION signal 303 is an IR signal. Since POSITION signal 303 emits from the location of the active speaker, it acts as a beacon for position control system 106 to locate and track the active speaker. Conversely, when a participant stops speaking, ACTIVE signal 301 and POSITION signal 303 are no longer generated. In this manner, video camera 102 is pointed at the person currently speaking and, as the speaker changes, so does the positioning of video camera 102.

Figure 4:
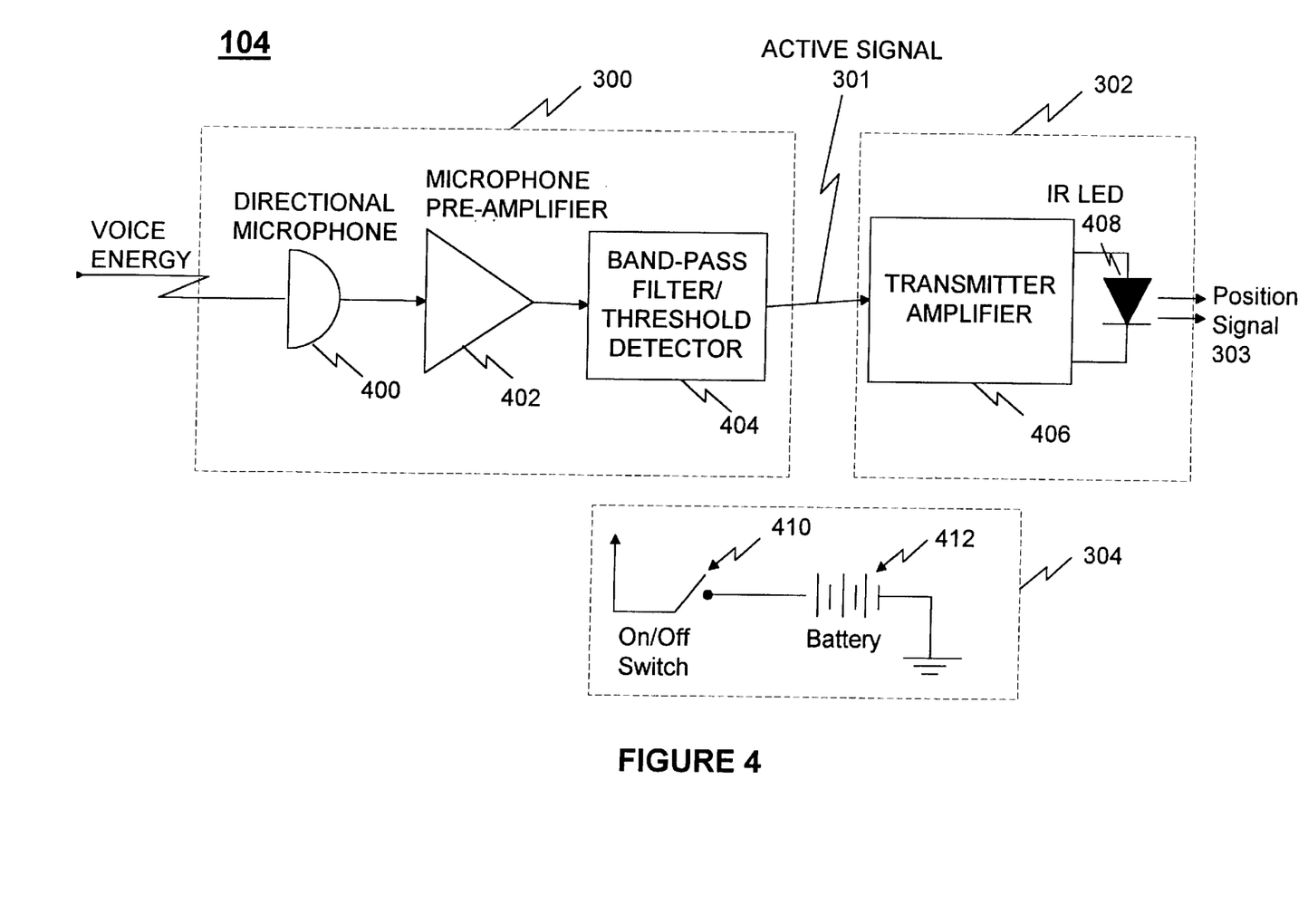
FIG. 4 is a detailed functional block diagram of a voice-activated emitter 104.

FIG. 4 shows a more detailed functional block diagram of emitter 104. At this functional level, transmitter 302 includes a transmitter amplifier 406 and an IR light emitting diode (LED) 408. Power source 304 includes an on/off switch 410 and a battery 412. In response to Active Signal 301, transmitter amplifier 406 electrically drives IR LED 408, thus generating POSITION signal 303.

Also, at this functional level, audio detector 300 includes a directional microphone 400, a pre-amplifier 402 and a band-pass filter/threshold detector 404 (filter/detector 404). To prevent false activation of emitter 104 (i.e., prohibiting the trigger of emitter 104 by ambient room noise or by the voice energy outside of the predetermined zone), directional microphone 400, microphone pre-amplifier 402, and filter/detector 404 are electrically tuned to detect only energy in the human voice frequency bandwidth. Furthermore, filter/detector 404 is designed to ignore low amplitude voice energy. Thus, under normal conditions emitter 104 is only responsive to the voice energy from the predetermined zone.

Figure 5:
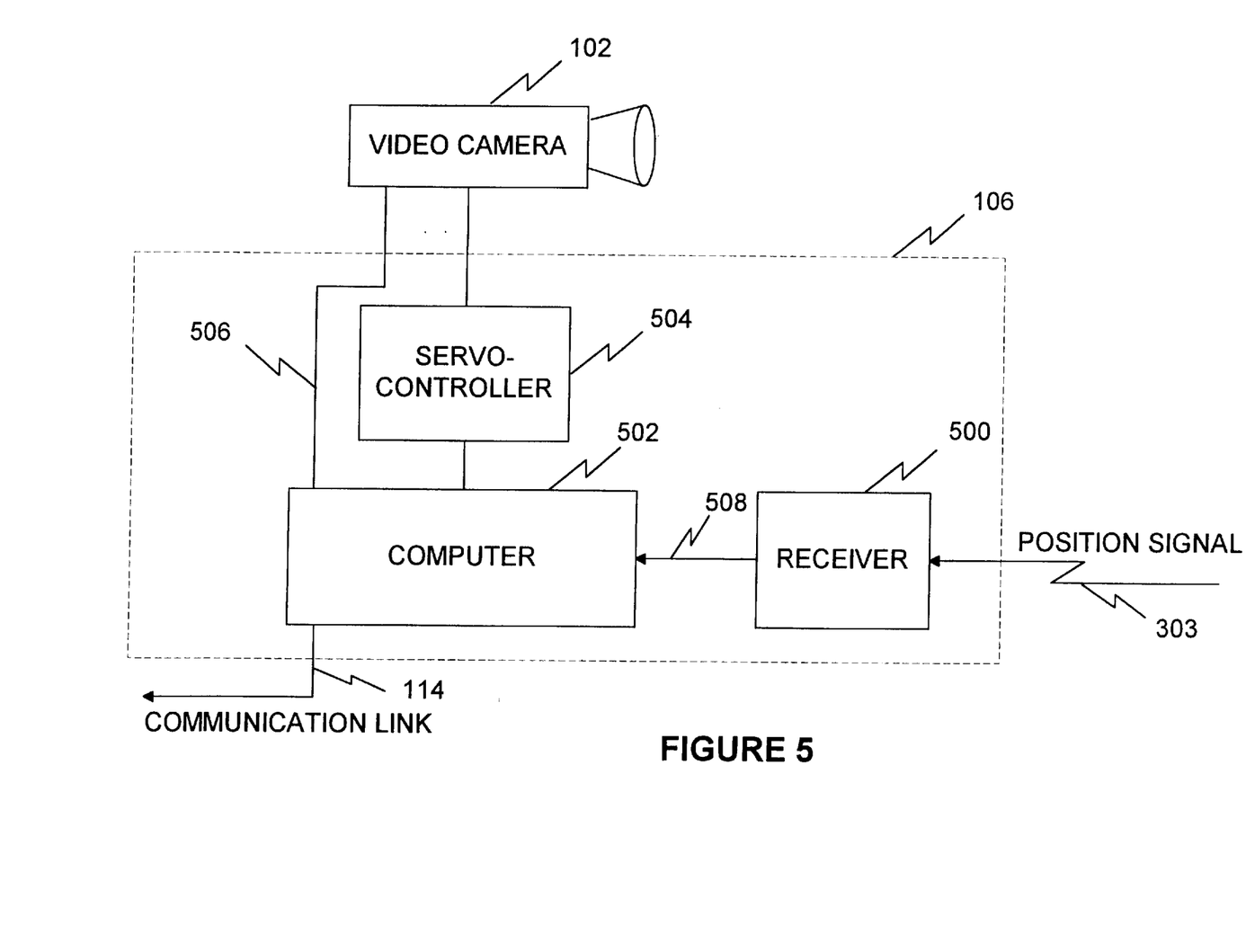
FIG. 5 is a functional block diagram of a position control system 106.

FIG. 5 is a functional block diagram of position control system 106. Position control system 106 includes a receiver 500, a computer 502, a servo-controller 504, and an RS-232 interface 506. In its preferred embodiment, receiver 500 is an array of three IR sensors. However, linear sensor arrays and other signal detecting devices may alternatively be used.

Computer 502 is an NCR Model 3333 general purpose computer available from NCR Corporation, Dayton, Ohio. Computer 502 includes the appropriate communication interfaces with receiver 500, servo-controller 504, and communication link 114. Computer 502 communicates with video camera 102 via RS-232 interface 506.

Servo-controller 504 is an electromechanical assembly in which video camera 102 is mounted. Servo-controller 504 performs the actual panning and tilting of video camera 102.

In the voice-following mode, the receiver 500 detects the IR signal from an activated emitter 104 and generates sensor array signal 508. By using linear programming and optical triangulation techniques, computer 502 determines the location of the source of the IR POSITION signal 303 (that is, the speaking participant). Computer 502 then determines the appropriate pan, tilt, and zoom adjustments and sends the corresponding commands to servo-controller 504 and video camera 102 via the RS-232 interface 506 to bring/maintain the active speaker within the field of view of video camera 102.

In the preferred embodiment, computer 502 is programmed with heuristics or other techniques to intelligently and gently track the motion of the active speaker. For example, computer 502 resolves conflicts when two or more participants are concurrently speaking by giving priority to the participant who was first detected, and filtering out short bursts of voice energy, such as when a participant is briefly responding to the active speaker. Another example is the situation when none of the participants are speaking, computer 502 is programmed to zoom out video camera 102 to provide a wide angle view of the conference.

Additionally, computer 502 may be programmed to analyze the output of video camera 102 to locate "head and shoulders" of the active speaker for precision adjustments of the field of view. Such a technique is disclosed in commonly owned, co-pending U.S. patent application Ser. No. 08/094,286; filed Jul. 19, 1993; titled, "Method and Means for Detecting People and Image Sequences", which is incorporated herein by reference.

Figure 6:
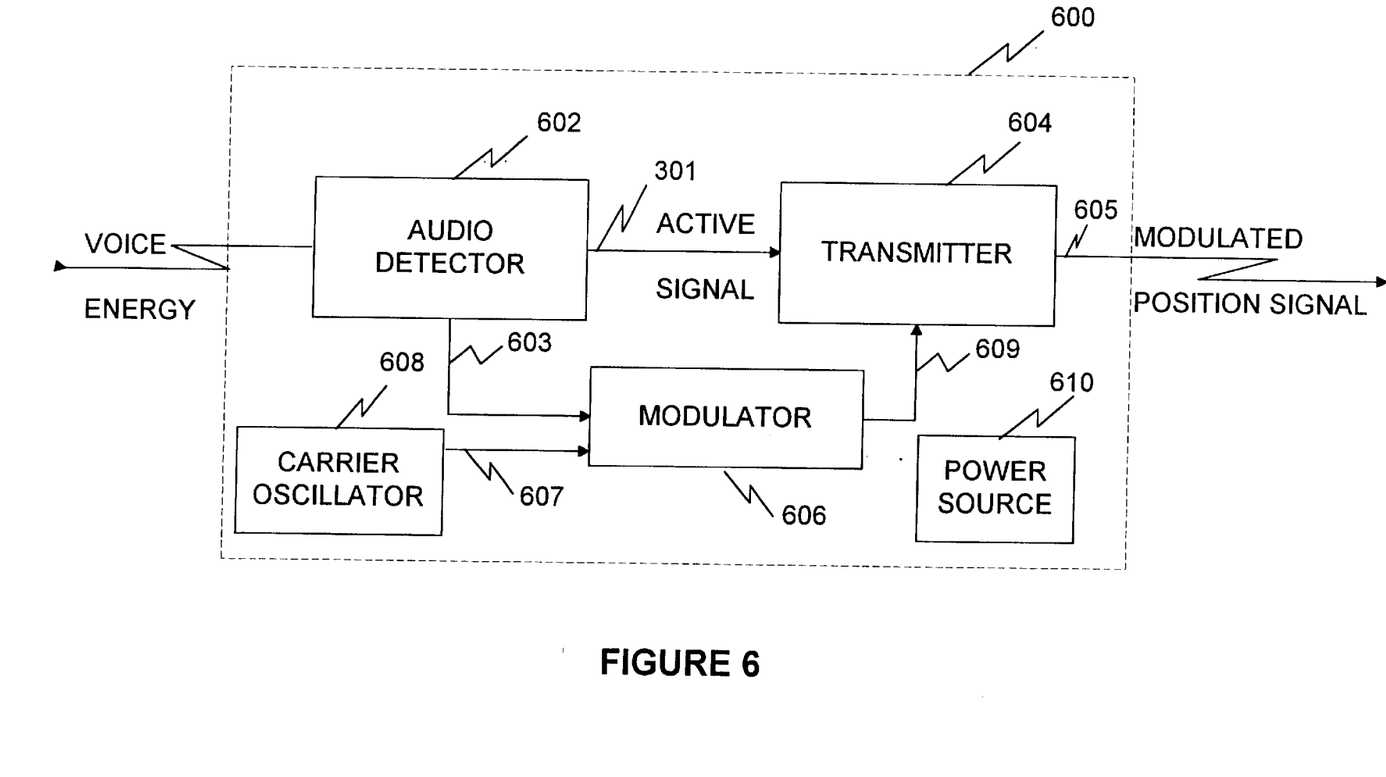
FIG. 6 is a detailed functional block diagram of a voice-activated modulating emitter 600.
Figure 7:
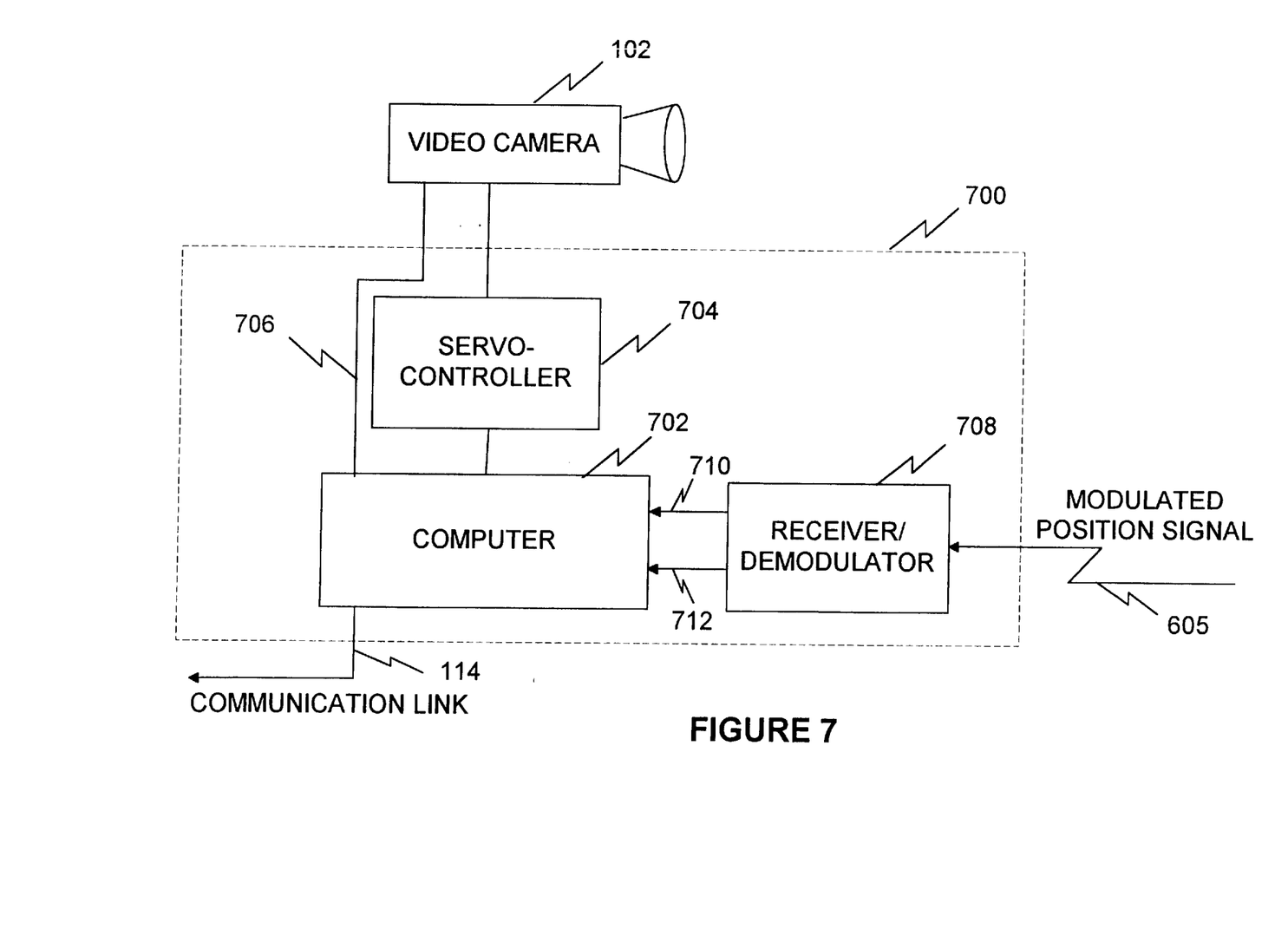
FIG. 7 is a functional block diagram of a demodulating position control system 700.

In an alternate preferred embodiment of the invention, emitter 104 may be replaced with a voice-activated modulating emitter 600. Emitter 600 is similar in operation to emitter 104. However, in addition to acting like a beacon to allow location of the active speaker, emitter 600 modulates the voice energy of the active speaker into a MODULATED POSITION signal 605, which is transmitted to a demodulating position control system 700. In this alternate preferred embodiment, however, position control system 700 includes a receiver/demodulator 708 for receiving MODULATED POSITION signal 605 demodulating it to recover the voice energy representing the active speaker's voice. Such a system eliminates the need for one or more centrally located microphones. In addition, the fidelity of the voice signal may be improved by eliminating many ambient room noises.

A block diagram of emitter 600 is shown in FIG. 6. Emitter 600 includes an audio detector 602, a transmitter 604, a carrier oscillator 608, a modulator 606, and a power source 610. Audio detector 602 and transmitter 604 operate in a manner similar to that of audio detector 300 and transmitter 302 of emitter 104 described above. In addition, however, audio detector 602 sends a voice energy signal 603 to modulator 606. Modulator 606 receives voice energy signal 603 and a carrier signal 607 from carrier oscillator 608. Modulator 606 then modulates carrier signal 607 with voice energy signal 603 to produce a modulated voice signal 609.

Transmitter 604 receives modulated voice signal 609 from modulator 606. Transmitter 604 produces MODULATED POSITION signal 605 when enabled by ACTIVE signal 301 from audio detector 602. MODULATED POSITION signal 605 is an IR signal which contains the voice energy signal 603 representing the speech of the active speaker.

A block diagram of position control system 700 is shown in FIG. 7. Position control system includes a receiver/demodulator 708, a computer 702, a servo-controller 704, and an RS-232 interface 706. Position control system 700 operates in a similar manner as position control system 106. Accordingly, receiver/demodulator 708 receives MODULATED POSITION signal 605 and generates a sensor array signal 710. In addition, receiver/demodulator 708 decodes MODULATED POSITION signal 605 and generates received voice energy signal 712, which reflects the voice energy of the active speaker.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A system comprising:
   a video camera;
   a plurality of sound-activated position signal generators that indicate locations of the position signal generators by emitting respective position signals only when corresponding sound signals are detected, and not emitting the position signals when the corresponding sound signals are not detected, each of the position signal generators including:
   a sound detector that detects a sound signal, and
   a position signal emitter coupled to the sound detector that emits a position signal only when the sound detector detects the sound signal;
   a position signal detector capable of detecting the position signals from any of the position signal generators; and
   a video camera positioning device that points the video camera in a direction of a position signal detected by the position signal detector, the positioning device positioning the video camera to follow the locations of the position signal generators as the locations of the position signal generators change.

2. The system of claim 1, wherein the sound detector detects the sound signal by comparing a magnitude of the sound signal with a threshold value and by generating an active signal when the magnitude of the sound signal exceeds the threshold value, the active signal indicating that the sound signal is a voice signal, and the position signal emitter emitting the position signal when the active signal is generated.

3. The system of claim 2, wherein the sound detector comprises:
   a microphone that receives the sound signal;
   an amplifier coupled to the microphone that amplifies the received sound signal; and
   a thresholding device coupled to the amplifier, wherein the thresholding device performs said comparing.

4. The system of claim 3, wherein the thresholding device includes a band pass filter that is tuned to select only sound signal frequencies in a human voice frequency band.

5. The system of claim 1, wherein said position signal emitter comprises an infrared light emitter emitting an infrared beam as the position signal.

6. The system of claim 1, wherein each of the position signal generators further includes a position signal modulator coupled to the sound detector and the position signal emitter, the modulator modulating the sound signal onto the position signal to generate a modulated position signal, the modulated position signal being emitted by the position signal emitter.

7. The system of claim 6, wherein the modulator modulates the position signal by first modulating a carrier signal based on the sound signal and then modulating the position signal based on the modulated carrier signal.

8. The system of claim 6 further comprising a demodulator coupled to the positioning device, the demodulator demodulating the modulated position signal received by the positioning device to reproduce the sound signal.

9. The system of claim 1, wherein each of the position signal generators further includes a position signal modulator coupled to the sound detector and the position signal emitter, the modulator modulating the sound signal and the position signal to generate a modulated position signal wherein the sound signal is carried by the position signal, the modulated position signal being emitted by the position signal emitter.

10. The system of claim 1, wherein the video camera positioning device comprises:
    a controller coupled to the position signal detector that detects the locations of the position signal generators based on the position signals and generates a control signal based on the locations of the position signal generators; and
    a servo-controller coupled to the controller that positions the video camera based on the control signal in such a way that when each of the position signal generators is attached to an object, that object is maintained in a field of view of the video camera.

11. A system for controlling a video camera, comprising:
    a plurality of sound-activated position signal generators, the position signal generators emitting position signals to indicate locations of respective position signal generators only when corresponding sound signals are detected and not emitting the position signals when the corresponding sound signals are not detected, each of the position signal generators including:
    a) a sound detector that detects the sound signal, and
    b) a position signal emitter emitting the position signal only when the sound detector detects sound signal;
    a position signal detector capable of detecting the position signals from any of the position signal generators; and
    a video camera positioning device that points the video camera in a direction of a position signal detected by the position signal detector, the positioning device positioning the video camera to follow one of the locations of the position signal generators as the one of the locations of the position signal generators changes.

12. The system of claim 11, wherein the sound detector detects the sound signal by comparing a magnitude of the sound signal with a threshold value, when the magnitude of the sound signal exceeds the threshold value, the sound detector generating an active signal, and receiving the sound signal as a voice signal, the position signal emitter of each of the position signal generators emitting the position signal only when the active signal is generated.

13. The system of claim 11, wherein the positioning device selects one of the position signal generators based on the emitted position signals, the positioning device positioning the video camera to follow a location of the selected one of the position signal generators, the positioning device maintaining an object attached to the selected one of the position signal generators in a field of view of the video camera.

14. The system of claim 13, wherein the positioning device selects the one of the position signal generators based on a priority system.

15. The system of claim 14, wherein the positioning device filters the emitted position signals to remove short bursts of the emitted position signals, the priority system directing the positioning device to select one of the filtered emitted position signals that is first detected by the position signal detector.

16. The system of claim 11, wherein each of the position signal generators further includes a position signal modulator coupled to the sound detector, the modulator modulating the position signal based on the sound signal to generate a modulated position signal, the position signal emitter emitting the modulated position signal.

17. The system of claim 16 further comprising a demodulator coupled to the positioning device, the demodulator demodulating the modulated position signal emitted by the selected one of the position signal generators to reproduce a sound signal that corresponds to the selected one of the position signal generators.

18. The system of claim 16, wherein the modulator modulates the position signal by first modulating a carrier signal based on the sound signal and then modulating the position signal based on the modulated carrier signal.

19. The system of claim 11, wherein the position signal emitter comprises an infrared light emitting source for emitting the position signal.

20. A system that automatically positions a video camera to follow an active speaker, comprising:
    position signal emitting means for emitting position signals only when corresponding voice signals of active speakers are detected and not emitting the position signals when the corresponding voice signals of the active speakers are not detected, the position signal emitting means including:
        a) sound signal detecting means for detecting a voice signal of an active speaker,
        b) emitting means coupled to the sound signal detecting means for emitting the position signals only when the sound signal detecting means detects the voice signal of the active speaker;
    position signal detecting means for detecting any of the position signals; and
    video camera positioning means for pointing the video camera in a direction of a position signal detected by the position signal detection means and for maintaining the active speaker in a field of view of the video camera by tracking the position signal as a location of the position signal changes.

21. A method for operating a system that controls a video camera, the method comprising:
    receiving emitted position signals which were emitted by position signal generators only when the position signal generators detected sound signals;
    detecting the emitted position signals emitted from any of the position signal generators; and
    pointing the video camera in a direction of a position signal detected by the detecting step such that the video camera is positioned to follow a location of one of the position signal generators as the location of one of the position signal generators changes.

22. The method of claim 21, further comprising detecting the sound signals using sound detectors of the position signal generators, and emitting a position signal when a sound signal is detected by one of the position signal generators.

23. The method of claim 22, wherein the detecting step comprises:
    comparing a magnitude of the sound signals with a threshold value;
    generating an active signal corresponding to the sound signals that exceed the threshold value; and
    characterizing the sound signals that exceed the threshold value as voice signals.

24. The method of claim 23, wherein the position signals correspond to the voice signals.

25. The method of claim 21, further comprising:
    selecting one of the position signal generators based on the emitted position signals;
    tracking a position signal emitted by the selected one of the position signal generators; and
    maintaining an object attached to the selected one of the position signal generators in a field of view of the video camera.

26. The method of claim 25, wherein the selecting step comprises selecting the one of the position signal generators based on a priority system.

27. The method of claim 26, further comprising filtering the emitted position signals to remove short bursts of the emitted position signals, wherein the selecting step selects one of the position signal generators that 1) emitted a position signal, 2) corresponds to one of the filtered emitted position signals, and 3) corresponds to a position signal which is first detected by the detecting the emitted position signals step.

28. The method of claim 21, further comprising modulating position signals of the position signal generators to generate modulated position signals, and emitting the modulated position signals.

29. The method of claim 28, further comprising demodulating one of the modulated position signals that was emitted by a selected one of the position signal generators to reproduce a demodulated sound signal.

30. The method of claim 28, wherein the modulating step comprises:
    modulating carrier signals based on the sound signals; and
    modulating the position signals based on the modulated carrier signals.

31. The method of claim 21, wherein each of the position signal generators includes an infrared light emitting source for emitting the emitted position signals.

32. A system for use with a video camera, comprising:
    a plurality of position signal generators that indicate locations of the position signal generators by emitting respective position signals only when sense signals are input to the position signal generators, each of the position signal generators including:
        a detector that detects a sense signal, and
        a position signal emitter coupled to the detector that emits a position signal only when the detector detects the sense signal;
    a position signal detector capable of detecting position signals from any of the position signal generators; and
    a video camera positioning device that points the video camera in a direction of one of the position signals detected by the position signal detector, the positioning device positioning the video camera to follow a location of one of the position signal generators as the location changes.

33. The system of claim 32, wherein the position signal emitter comprises an infrared light emitter emitting an infrared beam as the position signal.

34. The system of claim 32, wherein each of the position signal generators further includes a position signal modulator coupled to the detector and the position signal emitter, the modulator modulating the position signal based on the sense signal to generate a modulated position signal, the modulated position signal being emitted by the position signal emitter.

35. The system of claim 34, wherein the modulator modulates the position signal by first modulating a carrier signal based on the sense signal and then modulating the position signal based on the modulated carrier signal.

36. The system of claim 35, further comprising a demodulator coupled to the positioning device, the demodulator demodulating the modulated position signal received by the positioning device through the position signal detector to reproduce the sense signal.

37. The system of claim 32, wherein the video camera positioning device comprises:

a controller coupled to the position signal detector that determines the locations of the position signal generators based on the position signals and generates a control signal based on a location of one of the position signal generators; and a servo-controller coupled to the controller that positions the video camera based on the control signal in such a way that when the one of the position signal generators is attached to an object, that object is maintained in a field of view of the video camera.

38. A method for operating a system that controls a video camera, the method comprising:

receiving emitted position signals which were emitted by position signal generators only when sensory inputs are detected;

detecting the emitted position signals from any of the position signal generators; and pointing the video camera in a direction of a position signal detected by the detecting step such that the video camera is positioned to follow a location of one of the position signal generators as the location changes.

39. The method of claim 38, further comprising:

selecting one of the position signal generators based on the emitted position signals;

tracking a position signal emitted by the selected one of the position signal generators; and maintaining an object attached to the selected one of the position signal generators in a field of view of the video camera.

40. The method of claim 38, further comprising modulating the position signals to generate modulated position signals, and emitting the modulated position signals.

41. The method of claim 40, further comprising demodulating one of the modulated position signals that was emitted by the selected one of the position signal generators to reproduce a demodulated sensory input signal.

42. The method of claim 38, wherein the position signal generators include an infrared light emitting source for emitting the position signals.

* * * * *